May 17, 1955   J. B. CUNNINGHAM ET AL   2,708,703
MEANS AND METHOD FOR HEATING DIELECTRIC MATERIALS
Filed Dec. 2, 1950   5 Sheets-Sheet 1

INVENTOR.
JACK B. CUNNINGHAM
FRANK WILBURN
BY
ATTORNEY.

May 17, 1955   J. B. CUNNINGHAM ET AL   2,708,703
MEANS AND METHOD FOR HEATING DIELECTRIC MATERIALS
Filed Dec. 2, 1950   5 Sheets-Sheet 5

JACK B. CUNNINGHAM
FRANK WILBURN
INVENTOR.

BY
ATTORNEY.

United States Patent Office 2,708,703
Patented May 17, 1955

2,708,703

MEANS AND METHOD FOR HEATING DIELECTRIC MATERIALS

Jack B. Cunningham, North Hollywood, and Frank Wilburn, Burbank, Calif.; said Wilburn assignor to said Cunningham Application December 2, 1950, Serial No. 198,850

19 Claims. (Cl. 219—10.55)

This invention relates to the art of heating dielectric materials by the application of radio frequency energy and is directed to improvements in method and apparatus that are especially suited for the use of energy in the ultra high frequency spectrum.

The present application is a continuation-in-part of our prior application Serial No. 142,774, filed February 7, 1950, now Patent No. 2,662,302, for Method and Apparatus for Drying Film by Dielectric Heating.

The heating of dielectric materials by radio frequency energy is accomplished by subjecting the material to a high frequency electric field and depends upon the dissipation of energy within the body of the material by molecular friction. In this type of heating as heretofore practiced, the oscillating electric field has been applied to the material by two or more suitably energized electrodes arranged alongside the material.

There have been some attempts to generate the desired heat with the electrodes spaced away from the material, but such a procedure, aptly termed "stray field heating," has limited applicability and is inefficient because such a small proportion of the generated energy actually reaches the material in process. In most instances, it has been found necessary to place the electrodes in close pressure contact with the material. When this type of equipment is operated at relatively high frequencies, e. g., 27 megacycles, such as we have found most desirable for rapid heating, substantial electromagnetic energy radiation occurs from the electrode plates, particularly from the back faces of the latter. The further apart the electrode plates, the greater is the proportion of the energy so radiated and lost; and for substantial electrode spacing distances, such as are sometimes desired, so much energy is radiated that the process becomes impracticable.

One group of objects of the present invention intends to avoid a number of disadvantages inherent in these prior art methods that involve the use of electrodes. These disadvantages include the following: the problem of avoiding serious energy loss by radiation; the problem of avoiding flash-over or arcing with consequent damage to the apparatus as well as to the material in process; the poor distribution of the heating effect through the material with consequent excessive local stresses; the ineffective heating of material adjacent the electrodes, especially troublesome when the adjacent material is squeezed-out glue that remains soft and tacky unless thoroughly cured by heat; and, finally, the fact that the pressure of the electrodes against the material is often undesirable, for example, because the pressure may damage the material or may interfere with freedom of movement of the material during the process.

Another group of objects of the invention pertains to the position, orientation or pattern of the electric field relative to the material in process. In this regard a feature of the present disclosure is flexibility to meet widely different requirements in the heat processing of dielectric materials. The electric field may be projected by the present apparatus into the material to various controlled depths from one side or from both sides simultaneously without any physical contact between the apparatus and the material. The electric field may be oriented in any desired direction relative to the material and applied with any desired voltage gradient through the material. The electric field may be restricted in area of application as desired and may be concentrated in one particular location for relatively high local heating effect.

A further object of the invention is to provide a compact, highly efficient apparatus especially suitable for the continuous processing of material.

In general these various objects of the invention are achieved by using a cavity resonator that is suitably apertured for exposing the material in process to the electric field generated in the resonator. With respect to the use of electric energy, such a cavity resonator which can function at higher frequencies than possible with electrodes will not be subject to serious energy loss through radiation.

As will be apparent, the cavity resonator may take various configurations, and may be apertured in various ways in the different applications of the resonators to specific heating tasks.

The above and other objects and advantages of the invention will be understood by reference to the following detailed description taken with the accompanying drawings.

In the drawings, which are to be regarded as merely illustrative.

A cavity resonator of conducting material is functionally equivalent to a tuned circuit comprising capacitance and inductance in parallel. The capacity function is carried out by two opposite walls of the cavity which may be termed the capacitance walls and the remaining walls interconnecting the two capacitance walls serve as inductance walls and may be so named.

It is apparent that metallic cavities of various configurations may be used in various practices of this invention, including the configurations of spheres, cylinders, prisms, ellipsoids, etc. It is also apparent that in a cavity resonator of a given configuration which portions will be the capacitance walls and which portions will be the inductance walls will depend upon the orientation of the electric field or fields as determined by the manner in which the cavity is excited. In a cylindrical cavity, for example, the capacitance walls may be either the flat end walls of the cavity, or may be diametrically opposite portions of the cylindrical wall. It is usually, but not always, desirable that the two capacitance walls be approximately parallel to each other.

Figures 1, 2:
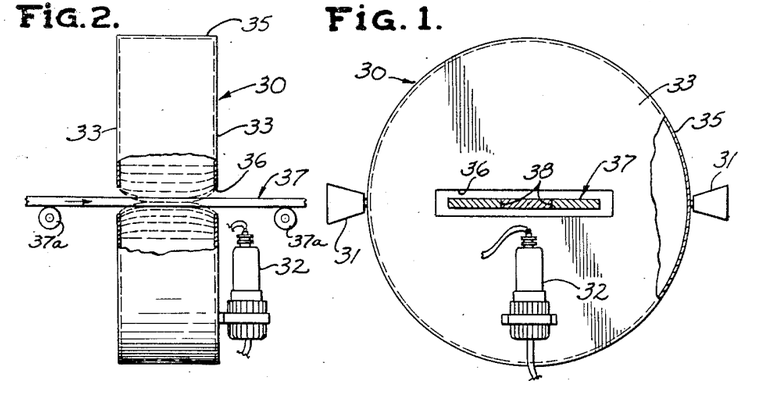
Figure 1 is a front elevation of a drum-shaped cavity resonator that may be employed in the practice of the invention.
Figure 2 is a side elevation of the cavity resonator with parts broken away.

Figures 1 and 2 show, by way of example, a cavity resonator generally designated 30 mounted on suitable non-conducting supports 31 and energized at a desirable frequency usually in the ultra high frequency spectrum by suitable means including a vacuum tube 32. A preferred arrangement for energizing the cavity resonator will be described later with reference to Figure 16.

The particular resonator 30 shown in Figures 1 and 2 is what may be termed "drum-shaped" since it is cylindrical in configuration with a diameter that is large relative to its axial dimension. The two end walls 33 which may be flat and parallel as shown are the capacitance walls that support the oscillating electric field and the circumferential wall 35 is the inductance wall of the resonator. It is contemplated that at least one of the two capacitance walls 33 will have a suitable aperture to permit material to be inserted into the interior of the resonator for treatment by exposure to the electric field between the two capacitance walls 33. Preferably, both of the capacitance walls 33 are apertured to permit the material to be passed through the resonator in one continuous direction. For this purpose, the two capacitance walls 33 have suitable apertures 36 in line with each other to permit a strip 37 of the material in process to travel through the resonator, as best shown in Figure 2. A cavity resonator is ordinarily a closed box, and its electric field is entirely confined therewithin. An opening in the cavity will permit the escape of electromagnetic energy, but the openings we have employed for passage of the material to be heated do not drain off sufficient energy to interfere with effective operation. In this respect the equipment differs from the electrode type of equipment which radiates substantial energy from the back faces of the electrodes, and is subject to such serious energy loss at relatively high frequencies as to be quite impractical when the interelectrode spacing distance is substantial.

By way of example, the strip of material 37 is shown in Figure 1 as comprising three longitudinal strips of wood that are to be bonded together by two intervening layers of glue 38, the function of the resonator being to cure or polymerize the glue to make the three wood strips into one solidly unified structure. As shown in Figures 1 and 2, the two apertures 36 may be rectangular slots to conform to the cross-sectional configuration of the material being treated and obviously other configurations for the apertures may be used to conform to materials of other configurations.

It will be further understood that the resonator will be furnished with suitable supporting, guiding or conveying means to aline or center the material with the apertures 36 and to support, guide, or convey the material through said apertures. These provisions will of course vary with the particular nature of the material being treated, and since they may readily be supplied by those skilled in the art for any specific situation encountered in practice, no elaborate illustration thereof is believed necessary herein, although guide rollers for the material 37 are diagrammatically indicated in Figure 2 at 37a.

As the material strip 37 travels through the resonator 30, as indicated by the arrow in Figure 2, the strip is progressively exposed to the electric field in the region of the two apertures 36. Attention is directed to the fact that the glue layers are substantially parallel to the direction of the field, and further, in this preferred example, that the electric field extends in the general direction of the travel of the material. Attention is also called to the important fact that the glue layers 38 and material strips 37 are in "parallel" with one another in the electric field, i. e., the portion of the field through the glue layers does not also have to penetrate the wood. The rate of heating for this parallel arrangement is proportional to the product of dielectric constant, power factor, and the square of the voltage gradient across the material in question, the product of dielectric constant and power factor being generally known as the dissipation factor. For the moist glue layer, the rate of heating will be high, owing to high power factor, high dielectric constant, and the fact that the full voltage available acts through the glue layer (rather than being partly consumed in the wood). A further advantage of the described arrangement is that the voltage available in the field acts within the glue layer for a substantial distance measured along the plane of the glue layer, and for a substantial proportion of the total length of the electric field. In comparison with a glue layer oriented transversely of the field, the advantage is very great, since the air gaps on either side of the glue are greatly reduced, and the voltage consumed in forcing the electric field through the air gaps is reduced accordingly. The voltage gradient available for treatment of the glue plane is therefore increased.

When the travel of the material strip 37 is considered, the advantage of alining the electric field longitudinally is in the prolonging of the time period of exposure of a given material particle for a given rate of material travel through the resonator. Often it is desirable to heat the traveling material moderately for a prolonged time period instead of heating the material intensely for a relatively short period, especially in the curing of synthetic resin glues. It is apparent that the temperature rise of the material may be controlled to a large extent by varying the rate of travel, the temperature rise varying inversely as the rate of travel. It is also apparent that the traveling material may pass through a series of resonators in close succession when it is desirable to prolong the duration of the heat treatment beyond the time required for the material to travel through a single resonator.

Figures 8, 9, 10, 11, 12, 13, 14, 15:
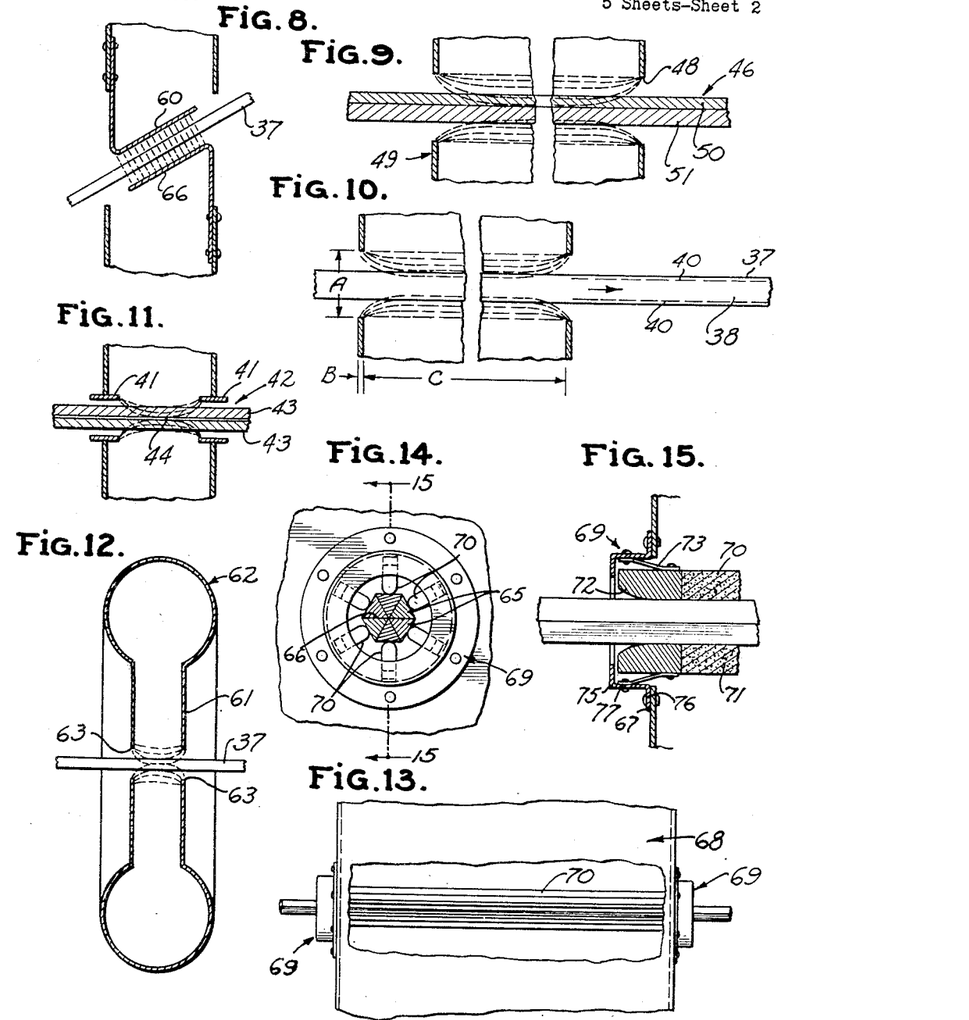
Figure 8 is a fragmentary view similar to Figure 5 showing how the two inner capacitance plates may be inclined to provide a longer path for processing the material.
Figure 9 is a fragmentary sectional view on an enlarged scale showing the disposition of the electric field relative to the traveling material in Figure 3.
Figure 10 is a similar view showing how the electric field in Figure 2 may be arranged for shallow penetration of the traveling material from opposite sides.
Figure 11 is a fragmentary sectional view similar to Figure 8 showing how the capacitance walls may have lateral extensions in the form of capacitance strips mounted at the two apertures of the drum-type cavity resonator.
Figure 12 is a vertical sectional view showing how the drum-type resonator may have re-entrant walls to give it the configuration of a doughnut.
Figure 13 is a fragmentary side elevation partly broken away showing how a drum-type cavity resonator may be provided with special jigs for fabricating fishing rods.
Figure 14 is a fragmentary view showing the arrangement of Figure 13 in front elevation.
Figure 15 is a fragmentary section taken as indicated by the line 15—15 of Figure 14.

A further important advantage of passing material through a resonator in the manner exemplified by Figures 1 and 2 is that the material is heat treated from opposite sides simultaneously and the depth of penetration of the electric field may be controlled as desired. Figure 10, for example, shows how the previously described strip of material 37 with the longitudinal glue layers 38 may be processed by the resonator in such manner that only the marginal edges of the glue layers are cured by the radio frequency energy. The depth of penetration of the heat treatment is indicated by the dash lines 40 in Figure 10. It is necessary, of course, to hold the individual pieces of wood together by lateral pressure as the strip 37 travels through the resonator, but the bonding together of the wood strips by the cured marginal portions of glue makes it unnecessary to continue the mechanical pressure, and thereafter the central portions of the glue layers 38 will cure over a more or less prolonged period of time without the necessity of further heat treatment.

The design, adjustment and energization of such a resonator for various depths of heat treatment is well within the skill of those experienced in this art. It may be pointed out here, however, that, with reference to the dimensions indicated in Figure 10, the depth of penetration may be decreased by increasing dimension A or by decreasing dimension B, or by decreasing dimension C.

Figure 11 shows, on the other hand, how the depth of penetration may be increased by making the apertures relatively small to shorten the distance between the metal of the resonator and the traveling material, and further shows how penetration can be even more increased by lining the apertures at least partially with bands of metal 41. The bands 41 are, in effect, inward lateral extensions of the capacitance walls. The strip of material 42 being processed in Figure 11, comprises two horizontal layers of wood 43 with an intervening horizontal layer of glue 44 and favoring depth of penetration, the provision as described increases the depth of penetration sufficiently to make it possible to heat the inner glue layer effectively, notwithstanding its remote location and the intervening thicknesses of wood.

Figure 3:
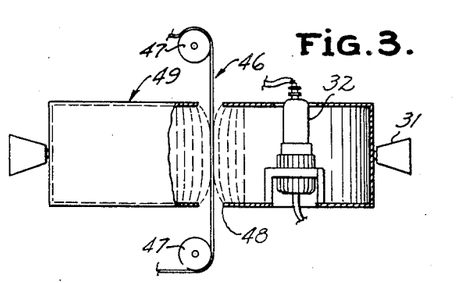
Figure 3 is a side elevation of the same type of cavity resonator positioned horizontally to process vertically moving material.

The purpose of Figure 3 is to show how the resonator shown in Figures 1 and 2 may be turned on its side for the continuous processing of material traveling in a vertical plane. In this instance, by way of example, a newly manufactured strip of photographic film 46 guided by suitable rollers 47 travels vertically through the apertures 48 of the resonator 49 for the purpose of drying the film. No supporting means for the film is required inside the resonator 49 so that the film is fully exposed to the surrounding electric field. Figure 9 shows the action of the electric field with respect to the emulsion and backing layers of the film.

As shown in Figure 9, the film strip 46 comprises an emulsion or gelatin layer 50 carried by a sheet or backing 51 of cellulose acetate or like material. Since the gelatin layer 50 has a high moisture content at this stage of manufacture it affords a high energy dissipation factor as compared with the acetate sheet 51. The heat-generating energy is concentrated in the water-laden emulsion while the cellulose acetate backing is heated to only a minor extent and to less than the degree that would cause the film to buckle.

Figures 4 to 8 show, by way of illustration, how two interior capacitance means in the form of plates may be mounted on the capacitance walls 33 respectively of the resonator 30 to divert at least a portion of the electric field from the previously described longitudinal orientation to a new lateral orientation across the traveling material. By using detachable capacitance plates of various configuration, various orientations of the electric field may be provided for various specific purposes in the different practices of the invention.

Figure 4:
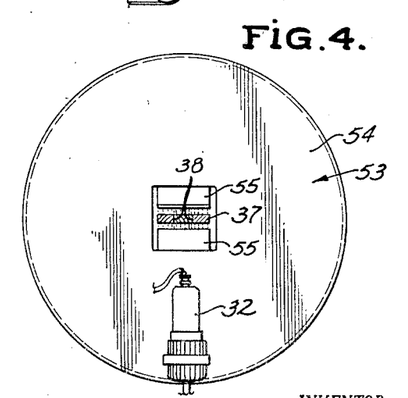
Figure 4 is a view similar to Figure 1 showing the drum type cavity resonator equipped with internal field-diverting capacitance plates.
Figure 5:
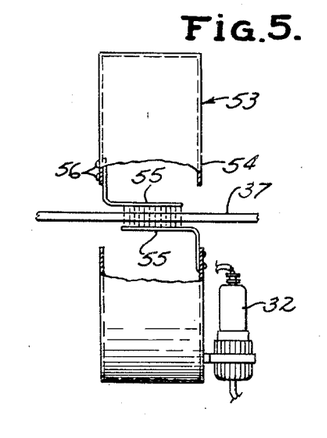
Figure 5 is a side elevation partly broken away, to show the position and extent of the inner capacitance plates.

The cavity resonator 53 shown in Figures 4 and 5 has a pair of spaced capacitance walls 54 on which are mounted two auxiliary capacitance plates 55 respectively, the two plates 55 being adjustably and/or detachably secured by suitable means such as bolts 56. Since the distance separating the two capacitance plates 55 is less than the distance from the end of either capacitance plate to the opposite capacitance wall 54, the electric field will be between the two plates, transversely of the strip of material 37. Thus, as shown in Figure 5, the strip of material 37 will pass progressively through a transverse electric field, its glue planes being parallel, however, to the field.

Figure 6:
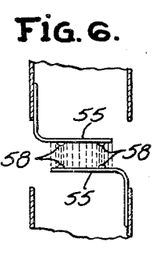
Figure 6 is a fragmentary view similar to Figure 5 showing how the two inner capacitance plates may be provided with protuberances in the form of transverse ribs for local concentration of the electric field.

A feature of certain practices of our invention is the concept of providing protuberances on the capacitance surfaces of the cavity resonator for local concentration of the eletcric field when such local concentration is desirable. The capacitance plates 55, for example, may be formed with ribs, bosses, or otherwise provided with protuberances for this purpose. Figure 6, for example, shows the two plates 55 provided with detachable ribs of metal 58 positioned transversely to the direction of travel of the strip 37, and in this instance all of the material particles pass successively through two high intensity regions of the electric field.

Figure 7:
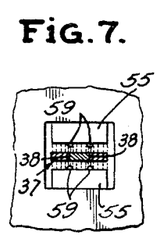
Figure 7 is a fragmentary view similar to Figure 4 showing how the two inner capacitance plates may be provided with protuberances in the form of longitudinal ribs.

Figure 7 shows how the capacitance plate 55 may be provided with longitudinally positioned detachable ribs 59 for concentration of the electric field along longitudinal zones alined with the direction of travel of the material strip 37. In this instance, the ribs 58 are positioned to concentrate the electric field in the planes of the longitudinal glue layers 38 of the traveling strip.

Figure 8 illustrates the fact that the auxiliary capacitance plates may be used in various manners to divert the electric field in various directions. In this instance inner capacitance plates 60 are inclined to provide an incline path for the traveling strip 37. It is apparent that the longitudinal dimension of the heat treating zone through which the strip 37 travels is increased in this manner and the density of the electric field is correspondingly decreased. Thus, in comparison with the arrangement shown in Figure 5, the arrangement shown in Figure 8 applied to the treatment of a strip 37 traveling at a given rate will subject the particles of the material to less intense heat treatment for longer periods of time.

The purpose of Figure 12 is to indicate how the capacitance walls 61 of a resonator generally designated 62 may be made re-entrant to give the resonator the cross-sectional configuration of a doughnut. The effect of this change in configuration is to cause the electric field to contract inwardly towards the center of the resonator with consequent increase in the density of the field in the region of the two apertures 63. It is also to be noted that the change in configuration also tends to make the field density more uniform across the traveling strip 37.

Figures 13, 14 and 15 show how our invention may be especially adapted for the fabrication of laminated fishing rods. As shown in cross-section in Figure 14, the fishing rod comprises six longitudinal strips of wood 65 of triangular cross-section which fit together to make a composite laminated structure of hexagonal cross-sectional configuration, the strips of wood being bonded together by intersecting layers of glue 66.

For the purpose of this particular task a resonator generally designated 68 of the type heretofore described is provided with a jig assembly 69 especially designed for this particular fishing rod.

The jig assembly 69 includes a series of radial pressure members 70 that extend through the interior of the resonator 68 and are adapted to hold the strips of wood 65 together by radially inward pressure, there being one pressure member 70 for each wood strip 65 as indicated in Figure 14. At least the central major portion of each pressure member 70 is made of heat resisting non-conductive material, for example, a suitable ceramic. While each pressure member may be made solely of ceramic, we prefer to provide the ceramic pressure members with metal ends. As shown in Figure 15, for example, each pressure member 70 may comprise a ceramic bar 71 with a metal shoe 72 solidly bonded thereto as an extension thereof.

The pressure members 70 may be mounted in the resonator 68 in any suitable manner that provides the desired radially inward pressure. In the particular construction shown in the drawings, the pressure members 70 are yieldingly carried at their opposite ends by suitable leaf springs 73 which leaf springs are suitably mounted on support bodies 75. Each support body 75, which is made of metal, has a skirt 76 for mounting adjacent the aperture of the resonator, and has a cylindrical wall 77 to which the leaf springs 73 are attached by suitable means.

When a loose assembly of the six wood strips suitably coated with the glue is inserted into the jig assembly 69, the radial pressure members 70 are thereby spread apart against the resistance of the leaf springs 73 thereby creating the desired radially inward pressure that holds the assembly together during the heat treating process. As the wood assembly is forced longitudinally through the resonator, the heat treatment cures the glue layers 66 while the assembly is under pressure, and a solid laminated rod issues from the opposite side of the resonator.

It is apparent that the metal of the two support bodies 75, the metal of the leaf springs 73, and the metal of the shoes 72 serve as extensions on the capacitance walls of the resonator, and that the electric field extends between the shoes 72 and is hence concentrated through the rod strips 65. For this purpose, the members 75, 73 and 72 are preferably formed of electrically conductive metal such as aluminum.

Figure 16:
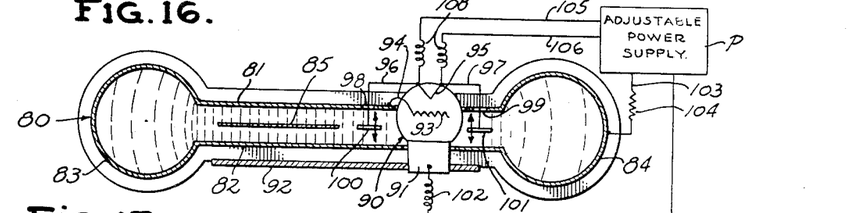
Figure 16 is a diagrammatic vertical section of a cavity resonator that is open at its sides.
Figure 17:
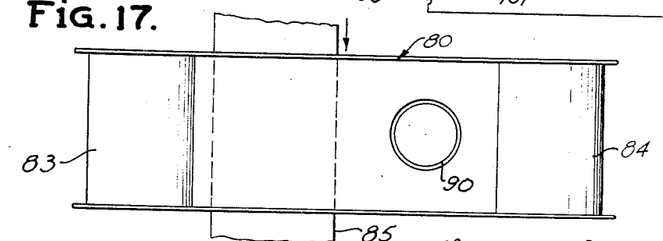
Figure 17 is a plan view of the resonator shown in Figure 16.

With reference to Figures 16 and 17, numeral 80 designates generally a modified re-entrant type of cavity resonator, or a medial section of a doughnut type of cavity resonator, having relatively close spaced capacitance walls 81 and 82, and inductance walls in the form of loops or open ended lobes 83 and 84, preferably hollow cylinders whose interior diameter is about three times the spacing distance between the capacitance walls 81 and 82. The lobes 83 and 84 are integrally joined to the capacitance walls 81 and 82, and while conveniently in the form of cylinders, they might consist of rectangular boxes, or have other forms. Also, while the lobes 83 and 84 are here shown with open ends, this is not to be regarded as essential, though it is necessary that the resonator be open at each side between capacitance walls 81 and 82 in order to provide for passage of the material therethrough. Without intention of limiting the invention, we have found that, for a strip of material such as a strip of photographic film 85 9½" wide, the resonator 80 may be of about 48" in length, and about 12" in width and that the walls 81 and 82 may be spaced 1½" and the cylinders 83 and 84 have an inside diameter of 9". Such a resonator will oscillate, when loaded, at around 90 megacycles.

It is an important feature of the invention, in all of the various embodiments, that the cavity resonator itself forms the tank circuit of a high frequency generator. In a preferred embodiment, this generator includes a high frequency oscillator tube 90 (Machlett ML 5530) whose anode 91 is seated in a capacity plate 92 positioned parallel to and closely spaced below the resonator capacitance wall 82. The anode and bulb of the tube 90 are accommodated by suitable apertures in the plates 81 and 82, as clearly shown in Figure 16. The anode 91 is in electrical contact with the capacity plate 92. The grid 93 of tube 90 is connected by short lead 94 to capacitance wall 81 and the two terminals of filament or cathode 95 are connected by short leads 96 and 97 passing through small apertures 98 and 99 in capacitance walls 81 to reach small condenser plates 100 and 101 respectively, positioned parallel to and about half way between the capacitance walls 81 and 82 on opposite sides of tube 90. These condenser plates 100 and 101 are to be understood as arranged through any suitable means, not shown, for adjustment movement between the capacitance walls 81 and 82, as indicated by the arrows.

The letter P designates conventionally any suitable adjustable power supply unit, adapted to supply a suitable high voltage through R. F. choke 102 to anode 91, a suitable grid bias voltage through lead 103 and grid bias register 104 to lobe 84, and filament heating current through leads 105 and 106 containing filter chokes 108 to the terminals of filament 95.

The circuit as thus described is basically the old ultra audion circuit in which plate to filament capacity is the interelectrode plate to filament capacity of the tube. In order to increase the plate to filament capacity to allow sufficient grid coupling to maintain oscillations, additional capacity is introduced externally of the tube, which in this instance comprises the novel use of the adjustable condenser plates 100 and 101 placed in the electric field between the capacitance walls 81 and 82, and therefore coupled to the capacity plate 92 connected to the anode and placed at close spacing to the capacitance wall 82. It will be seen that the grid bias voltage is applied to the grid by way of the lead 103, resistance 104, lobe 84, capacitance wall 81 and lead 94, while suitable anode coupling and filament-grid phasing is obtained by the adjustable condensers 100 and 101 within the electric field of the resonator to establish oscillations at the desired frequency.

In operation, a concentrated high intensity uniform field is established in the center section of the resonator between the capacitance walls 81 and 82 owing to the oscillatory system, the field being at right angles to and extending between the capacitance walls 81 and 82 as indicated by the dotted lines.

The material to be processed may be placed in the electric field between the two capacitance walls 81 and 82, or may be passed continuously through the resonator in any suitable manner or by any suitable conveying means. Figures 16 and 17 show the strip of film 85 moving continuously through the resonator for progressive exposure to the electric field therein.

Figure 18:
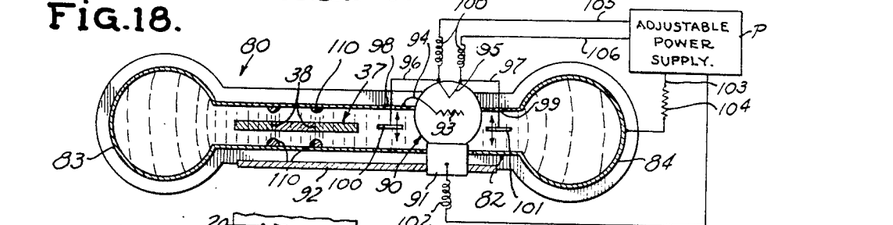
Figure 18 is a fragmentary section similar to Figure 16 showing how the capacitance walls of the resonator may be provided with what may be termed longitudinal protuberances.
Figure 19:
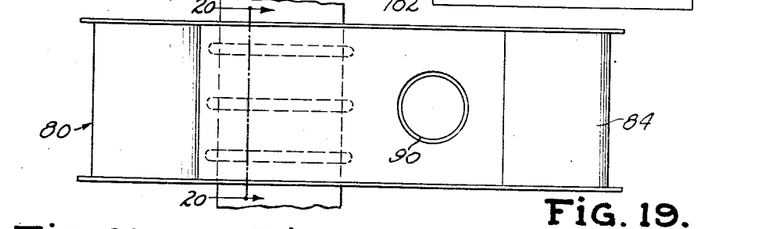
Figure 19 is a fragmentary view similar to Figure 17 of the same resonator provided with what may be termed transverse protuberances.
Figure 20:
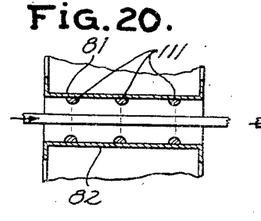
Figure 20 is a section taken as indicated by the line 20—20 of Figure 19.
Figure 21:
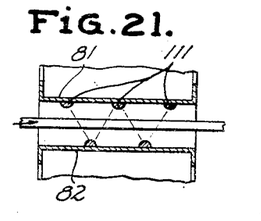
Figure 21 is a view similar to 20 showing a slightly different arrangement of the transverse protuberances.

The capacitance walls 81 and 82 may be off-set or otherwise provided with protuberances for local concentrations of the electric field. Thus Figure 18 shows, by way of example, detachable metal ribs 110 placed on the inner surfaces of the two capacitance walls 81 and 82, in parallelism to the direction of travel of the strip material, to concentrate the electric field in the region of the longitudinal layers 38 of glue in a previously described strip of material 37. By way of further example Figures 19 and 20 show how similar detachable metal ribs 111 may be added to the capacitance walls 81 and 82 to concentrate the electric field in transverse zones. Figure 21 shows how the ribs 111 may be placed in staggered relation to cross the traveling material with diagonal concentrations of the electric field.

Figure 22:
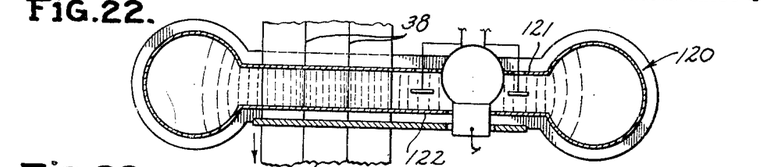
Figure 22 is a view similar to Figure 16 showing the same resonator adapted to process material traveling in a direction perpendicular to the capacitance walls of the resonator.
Figure 23:
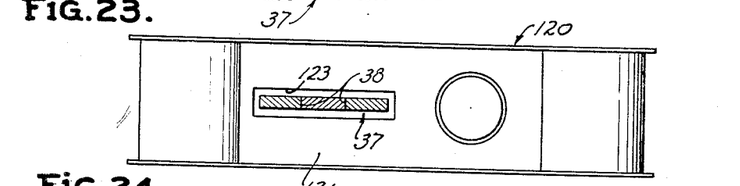
Figure 23 is a plan view of the resonator shown in Figure 22.

Figures 22 and 23 show a resonator generally designated 120 substantially identical with the previously described resonator 80 except that, in this instance, the parallel capacitance walls 121, 122 have suitable apertures 123 in line with each other to permit the strip of material 37 in process to be moved vertically through the resonator and perpendicularly to the capacitance walls 121 and 122. In this way the traveling material is exposed to an electric field extending longitudinally of the traveling material with all of the advantages heretofore pointed out. Attention is particularly directed to the parallelism between the glue layers 38 and the electric field, to the reduction of the air gaps as compared with the resonator of Figures 16 and 18, and to the fact that the glue layers are in parallelism with the wood strips, i. e., the field does not have to pass through the wood to reach the glue layer.

Figure 24:
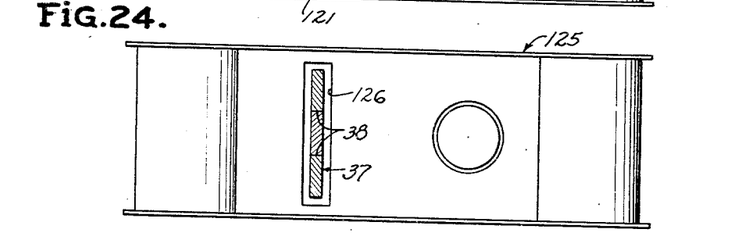
Figure 24 is a similar plan view showing the material traveling in a plane at 90 degrees from that shown in Figure 23.

Figure 24 shows a resonator generally designated 125 that is substantially identical with the resonator 120, the slot or aperture 126 for the passage of material through the resonator is positioned at 90 degrees relative to the apertures 123 in Figure 23. The electric field is slightly more uniform in density across the long dimension of the slot in Figure 24 than across the long dimension of the slot in Figure 23.

Figures 25, 26, 27, 28:
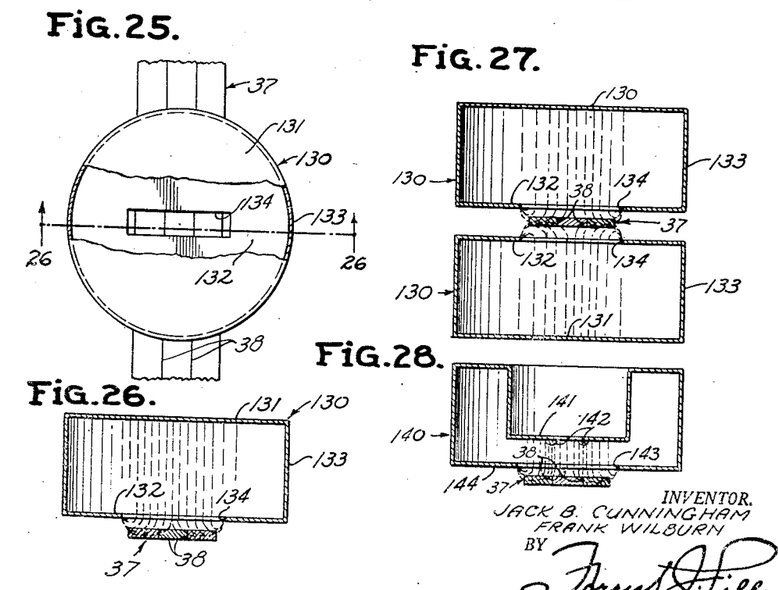
Figure 25 is a plan view, partly broken away, showing a cavity resonator adapted to radiate energy into the traveling material.
Figure 26 is a section taken as indicated by the line 26—26 of Figure 25.
Figure 27 is a similar sectional view showing two cavity resonators radiating energy into the traveling material from opposite sides.
Figure 28 is a similar sectional view showing how such a cavity resonator may be provided with a re-entrant wall and protuberances thereon for concentrating the electric field at the selected area.

Figures 25 and 26 illustrate the fact that in some practices of our invention a cavity resonator may be provided with a suitable aperture for projecting energy into the material in process, largely by radiation of the energy. Such a radiating aperture may be provided in various parts of a cavity resonator but preferably will be in one of the capacitance walls of the resonator and also preferably the opposite capacitance wall will be continuous or blank to favor radiation from the aperture.

Figures 25 and 26 show a drum-shaped resonator, generally designated 130, having an upper capacitance wall 131, a lower capacitance wall 132 and a circumferential inductance wall 133. The lower capacitance wall 132 has a suitable aperture or slot 134 for the radiation of electromagnetic energy downward into the body of the strip of material 37 in process. The depth of penetration of the electric field produced and radiated in this manner may be regulated by the suitable selection of physical and electrical parameters including the physical dimensions of the cavity resonator, the dimensions of the aperture 134, the frequency of the electric power, and the spacing of the strip of material 37 from the aperture 134. It is apparent that the desirability of varying the physical dimension of the resonator for various specific applications of the invention where various depths of penetration are desired, will result in the use of resonators differing widely from the configuration shown in Figures 3 to 6.

Figure 27 shows how two resonators 130 of the type shown in Figures 25 and 26 may be paired together for simultaneous heat treatment of the material 37 from opposite sides above and below the traveling material.

Figure 28 shows how a resonator generally designated 140 of this radiating type may be provided with a re-entrant blank capacitance wall 141 and further shows how this re-entrant wall may be provided with protuberances in the form of detachable metal ribs 142 opposite the aperture 143 in the lower capacitance wall 144. These ribs may be positioned longitudinally of the traveling strip 37 in alinement with the two glue layers 38 as shown for reasons heretofore explained.

As earlier mentioned, the apparatus will ordinarily be equipped with some suitable supporting, guiding or conveying means for carrying the strip material through the intended treatment zone. Since these provisions are well within the skill of the art, and since they must necessarily vary from case to case depending upon the nature of the material being treated, for simplicity of treatment, only certain of the figures contain illustration thereof. Similar conveying and supporting provisions, in the form of guides, guide rolls, pressure means, and the like, will be understood as employed where necessary as incorporated in said embodiments by reference to the particular figures containing such illustrations.

The cavity resonators of the present invention may be employed for dielectric heating of any dielectric article to be rapidly dried or heated by the provision of suitable conveying means for passing it through the electric field within the cavity. For example, the invention is particularly applicable and valuable as applied to the conditions of preheating of thermo-plastic and thermo-setting plastics in the form of pellets or preforms, and also in the form of powdered and granular plastics. The purpose of preheating plastic materials is to increase the temperature rapidly to a level which will cause polymerization of the plastic material within a very short time interval after reading the critical polymerization temperature. Our cavity resonators, equipped with continuous conveying means for conveying the plastic materials, pellets or preforms through and away from the heating field and directly to the forming or molding machinery, reduces the time elapsed between reaching of polymerizing temperature and the time of insertion into the mold or form, to obvious advantage.

Figure 29:
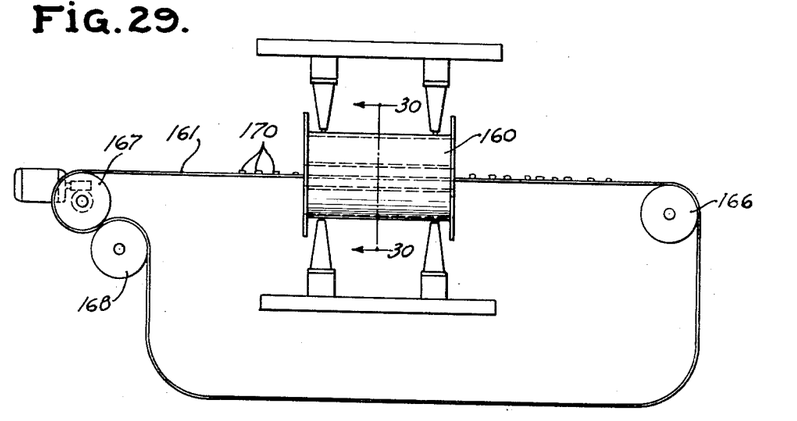
Figure 29 is a side elevational view of the cavity resonator in accordance with the invention.
Figure 30:
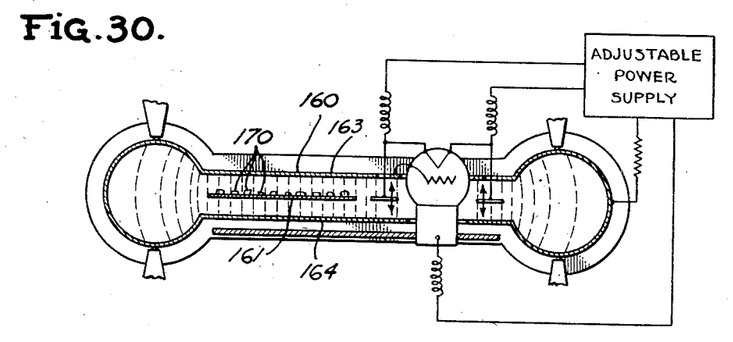
Figure 30 is a section taken on line 30—30 of Figure 29.

Referring to Figures 29 and 30, a cavity 160 is shown, generally like that of Figures 16 and 17, and this cavity is equipped with an endless conveyer belt 161 arranged to pass through the dielectric field between the capacity plates 163 and 164 of the resonator, the belt passing first over an idler roll 166 located at one side of the resonator, thence through the resonator to a driven roll 167, being then passed around idler roll 168 which holds it in proper engagement against the periphery of roll 167. Returning from roll 168 to roll 166, the belt loops down and hangs below the apparatus as clearly indicated in the drawings. Any conveyer belt capable of standing the high heat withing the resonator may be used, though we prefer to use a silicone rubber belt which is well able to stand up under the high heat conditions imposed. The plastic articles, such as indicated at 170, are carried through the resonator on this belt, as clearly indicated in the figures. In practice they are found to be uniformly heated regardless of shape, which result is due to the uniformity of the electric field maintained by the cavity. As it is important to be able to regulate the speed of travel of the articles in passing through the resonator, a variable speed drive motor is employed, or alternately, a variable speed drive may of course be employed between a constant speed motor and the drive roll.

We have now disclosed the invention in a number of typical embodiments indicating the wide range of possible forms and configurations and it will be understood that many variations and modifications are possible, and the invention is accordingly to be limited only in accordance with a fair interpretation of the following claims.

We claim:

1. In a high frequency resonator, the combination of: a pair of parallel resonator plates spaced apart for a dielectric field, inductor loops connecting corresponding end portions of said plates, a capacity plate coupled to one of said parallel resonator plates, a condenser plate in the electric field between said resonator plates, and a high frequency oscillator tube having its anode connected to said capacity plate, its grid connected to the other of said resonator plates, and its cathode connected to said condenser plate in said electric field.

2. In a high frequency resonator, the combination of: a pair of parallel resonator plates spaced apart for a dielectric field, inductor loops connecting corresponding end portions of said plates, a capacity plate coupled to one of said parallel resonator plates, a pair of condenser plates positioned in the electric field between said parallel resonator plates, and a high frequency oscillator tube having its anode connected to said capacity plate, its grid connected to the other of said parallel resonator plates, and its filament terminals connected to said pair of condenser plates.

3. In a high frequency resonator, the combination of: a pair of resonator plates spaced apart for a dielectric field, inductor loops connecting corresponding end portions of said plates, a capacity plate coupled to one of said resonator plates, a pair of condenser plates positioned in the electric field between said resonator plates, and a high frequency oscillator tube having its anode connected to said capacity plate, its grid connected to the other of said resonator plates, and its filament terminals connected to said pair of condenser plates.

4. In a dielectric heating apparatus, the combination of: a pair of substantially parallel resonator plates spaced apart for a dielectric field, inductor loops connecting corresponding end portions of said plates, a capacity plate coupled to one of said parallel plates, apertures in said plates near one end thereof for reception of a vacuum tube, a high frequency oscillator tube positioned in said apertures, condenser plates mounted in the electric field between said parallel plates in proximity to said oscillator tube, a connection between the anode of said tube and said capacity plate, a conductor connecting the grid of said oscillator tube to the other of said parallel plates, conductors between the filament terminals of said tube and said condenser plates, and a means for guiding an article to be heated through the dielectric field space between said parallel plates and between said oscillator tube and the inductor loop at the opposite ends of said resonator.

5. In a dielectric heating apparatus for treating materials, a high frequency oscillation generator comprising: a vacuum tube having cathode, grid, and anode elements; a tank circuit for said tube consisting of a cavity resonator having opposed capacitance walls for establishing an electric field therebetween, and at least one inductive end wall connecting edge portions of said capacitance walls; a capacity plate forming a capacitor with one of said cavity resonator capacitance walls; a condenser plate disposed in said electric field between the capacitance plates of said resonator; means connecting said filament to said condenser plate, said grid to the other of said capacitance walls, and said anode to said capacity plate; and means for exposing material to be treated to said electric field.

6. An apparatus according to claim 5, in which said means for exposing material to be treated to said electric field comprises: alined openings in said capacitance walls for passing material through the interior of said cavity resonator in a direction substantially parallel to the direction of said electric field.

7. An apparatus according to claim 5, in which said means for exposing material to be treated to said electric field comprises: alined openings in said cavity resonator for passing material through the interior of said cavity resonator in a direction substantially perpendicular to the direction of said electric field.

8. An apparatus according to claim 5, in which said capacitance walls are in the form of spaced circular plates, said inductance wall comprising a figure of revolution having a looped-shaped cross section of a span greater than the spacing of the capacitance walls, in such manner as to give said cavity a re-entrance configuration, and said capacitance walls being apertured for passage of the material to be treated through the interior of the cavity resonator.

9. An apparatus according to claim 5, in which said means for exposing material to be treated to said electric field comprises: an aperture in at least one of said capacitance walls for radiation of electromagnetic energy from the resonator, whereby the material may be placed outside the resonator opposite said aperture for exposure to the radiant energy.

10. In a dielectric heating apparatus, the combination of two high frequency oscillation generators each constructed in accordance with claim 5, having their cavity resonators spaced apart to provide a material treating zone between the resonators, said means for exposing material to be treated to said electric field in each of the resonators comprising: opposed openings in said resonators for radiation of electromagnetic energy toward said zone.

References Cited in the file of this patent

UNITED STATES PATENTS

| | | |
|---|---|---|
| 2,227,372 | Webster et al. | Dec. 31, 1940 |
| 2,243,426 | Kircher | May 27, 1941 |
| 2,272,211 | Kohler | Feb. 10, 1942 |
| 2,281,935 | Hansen et al. | May 5, 1942 |
| 2,284,405 | McArthur | May 26, 1942 |
| 2,342,897 | Goldstine | Feb. 29, 1944 |
| 2,384,541 | Fruth | Sept. 11, 1945 |
| 2,454,560 | Lafferty | Nov. 23, 1948 |
| 2,457,498 | Russell et al. | Dec. 28, 1948 |
| 2,466,853 | Kinn | Apr. 12, 1949 |
| 2,483,933 | Revercomb et al. | Oct. 4, 1949 |
| 2,521,993 | Parker | Sept. 12, 1950 |
| 2,560,903 | Stiefel | July 17, 1951 |
| 2,583,338 | Morse et al. | Jan. 22, 1952 |

FOREIGN PATENTS

| | | |
|---|---|---|
| 222,315 | Switzerland | July 15, 1942 |
| 580,374 | Great Britain | Sept. 5, 1946 |
| 969,699 | France | Dec. 22, 1950 |